United States Patent Office 3,520,313
Patented July 14, 1970

3,520,313
PROCESS FOR FACILITATING PIPELINE FLOW OF HIGHLY VISCOUS LIQUIDS
Errol V. Seymour, Houston, Tex., assignor to Shell Oil Company, New York, N.Y., a corporation of Delaware
No Drawing. Filed Dec. 8, 1967, Ser. No. 688,961
Int. Cl. E21b 43/26; F17d 1/16
U.S. Cl. 137—13                                3 Claims

ABSTRACT OF THE DISCLOSURE

A method for facilitating flow of a highly viscous water-immiscible liquid in conduits by forming a water-immiscible liquid-in-water mixture containing in the water phase of the mixture a water-soluble polymer capable of functioning as a friction reducer.

This invention relates to a method for transporting through conduits, e.g., pipelines and tubing strings, highly viscous liquids and more particularly to the transportation of viscous crude oils through pipelines at increased throughput and under reduced friction.

BACKGROUND OF THE INVENTION

The transportation of extremely viscous liquids, such as highly viscous crude oils through pipelines, presents many difficult problems even when pressures near the maximum permissible for standard pipe and pumping equipment are used.

Under these conditions various means for facilitating the flow of viscous crude oils have been used such as heating the crude oil or diluting it with hydrocarbon diluents or with water and water solutions containing non-ionic surfactants, metal phosphates and ammonia. These methods have proven to be unsuccessful in some applications because of cost factors as in the case of heating the crude or use of hydrocarbon diluents or availability of the diluents.

It is an object of the present invention to improve the transportation of crude oils and similar viscous water-insoluble liquid products.

It is another object of this invention to facilitate the movement through pipelines and similar equipment of viscous petroleum and fractions thereof.

It is a further object of this invention to provide a method for moving highly viscous crude oils through pipelines at a high rate of speed.

It is still another object of the present invention to provide for rapid transportation of a mixture of crude oil-in-water solution at a low pumping cost and at reduced friction, the solution being so constituted that the water is maintained as the continuous phase and readily separates from the oil phase when desired.

SUMMARY OF THE INVENTION

Now, in accordance with this invention, it has been found that when transporting viscous liquid mixtures, e.g., crude oil-in-water mixtures, through a pipeline, they can be readily separated into two distinct phases at the terminal end of the line and require during their transportation a minimum of pumping power by maintaining in the water phase from about 10 to about 1000 p.p.m. of a water-soluble polymeric compound having a molecular weight of at least one million and can be higher than fifty million. The water concentration is between about 10% and 50% by weight of the mixture and the flow conditions must be turbulent. Crude oils transported by this means can be in the viscosity range of from 3000 cs. at 60° F. to above about 50,000 cs. at 60° F. The water-soluble polymer functions as a friction-reducing agent and helps to maintain the water as the continuous phase directly in contact with the walls of the pipeline.

The water-soluble polymeric compounds and preferably those containing polar constituents can be selected from a wide variety of materials including homo- and copolymers containing polar groups and having a molecular weight of at least one million. Polymers and copolymers of this type include polyacrylamides, polyalkylene oxide polymers and copolymers, copolymers of acrylamide and acrylate esters, copolymers of acrylamide and methacrylate esters, copolymers of acrylamide and polymers or copolymers of ethylene oxide and/or propylene oxide, mixtures of polyacrylamide polymers and polymers of ethylene oxide and/or propylene oxide, polyvinylacetates, vinyl sulfonic acid polymers and derivatives thereof. Other materials include natural products such as guar gum, polysaccharide and derivatives thereof. Mixtures of the same or different homo- and copolymers can be used.

A particularly preferred class of water-soluble polar-containing polymers are the polymerized olefin oxides, e.g., polymers of ethylene oxide, and copolymers thereof made by any suitable means such as described in U.S. Pats. 3,256,211, 3,274,129, and 3,284,374. The ethylene oxide polymers which are effective are the long-chain polymers which are characterized by a minimum of cross-linkages and high molecular weight. Such ethylene oxide polymers should have a molecular weight in the range of from 1 to 10 million and those having a molecular weight in the range of 3 to 8 being preferred. Polyethylene oxide polymers having a molecular weight of at least one million are commercially available from Union Carbide under the trade name of "Polyox" resins such as Polyox Resin WSR–301, which has a molecular weight of $4 \times 10^6$.

The other preferred class of polymers are the polyacrylamides and derivatives thereof. These polymers can be obtained by polymerizing acrylamide with or without suitable comonomers, to prepare essentially linear acrylamide polymers. Usually this polymerization is conducted under the influence of a chemical polymerization catalyst such as benzoyl peroxide. These acrylamide polymers are water-soluble. In the instance of polyacrylamide, the polymer may be used as obtained after polymerization or the polyacrylamide may be partially hydrolyzed by the reaction thereof with a sufficient amount of a base, such as sodium hydroxide, to hydrolyze a portion of the amide groups present in the polymer molecule.

PREFERRED EMBODIMENT OF THE INVENTION

An economical and efficient way to transport a viscous crude oil through a pipeline by the process of this invention is to pump the oil co-currently with water containing a polymer as described. This method of transport is more economical for oil viscosities above approximately 3000 cs. at 60° F. For oil-water transport to be effective, the oil should be dispersed in droplets, or flow as a core, in a continuous water phase with only the water phase in continuous contact with the wall. Flow rates should be high enough to keep the layer of water near the wall in turbulent flow.

The present invention is concerned with making oil-water mixtures in which the water phase contains a water-soluble polymer for pipeline transport effective and economical by reducing the pressure drop required to maintain the flow of the mixture through the pipeline. In an oil-water two-phase flow for mixture velocities [the mixture velocity is defined as the total volume flow rate (oil plus water) divided by the cross-sectional flow area of the pipe] between 2 and 10 ft./sec., the pressure drop varies from approximately one to four times the pressure drop for water alone flowing at a velocity equal to the mixture velocity of the two phase flow. As the mixture velocity decreases, the pressure drop ratio increases.

More specifically, the present invention is concerned with the addition of a water-soluble friction-reducing polymeric agent to the water phase to reduce the turbulent energy dissipation in this phase. The additive is more effective at high pipeline flow rates where the flow is more turbulent. The pressure drop for an oil-water flow, provided the mixture velocity is high enough, can be reduced below the pressure drop for water alone at the same mixture velocity by adding a suitable water-soluble polymer. The water-soluble friction-reducing agent is added to the water phase rather than to the oil phase, because the highest shear rates occur near the wall in the water phase.

To illustrate this invention, the following experiment was carried out. Oil and water were pumped around the ½ inch pipeline. Oil and water were pumped from separate tanks and combined and thereafter discharged into a common discharge tank. Two water supply tanks were used, one containing water-soluble polyethylene oxide (Polyox Resin WSR-301) as the friction-reducing material and the other containing clean water. Water suction could be changed from one tank to the other during a run to check the effect of the friction-reducing polymer directly.

The oil-water flow consisted of a core of oil droplets in a continuous water phase surrounded by an annulus of clear water. The oil-water dispersion showed no tendency to invert to an oil-phase-continuous emulsion, and static separation of the two phases in a sample taken from the pipeline discharge occurred in a few minutes.

The flow conditions are shown in Table 1.

TABLE 1

Pipeline fluid temperature—76° F.
Oil viscosity [1] at 76° F.—600 cs.
Oil specific gravity at 60/60 F.—0.92
Oil flow rate—2.7 g.p.m.
Water flow rate—3.05 g.p.m.
Oil-water ratio, percent v. oil/percent v. water—47/53
Mixture velocity (5.75 g.p.m. in ½ inch pipe)—9.6 ft./sec.

[1] Silver Shell Motor Oil Grade 30.

The procedure for each run was as follows. The pipeline was run with oil plus clean water and pressure drop and flow rates recorded. Without stopping the pipeline, feed from the clean water tank was transferred to the water-polymer tank, and minor flow rate adjustments made to keep both flow rates the same. After pressure drop was recorded, operation with clean water was resumed. It was found the pressure drop returned to the initial value previous to the use of polymer solution.

The amount of friction reduction obtained in each run is shown in Table 2. The percent friction reduction is defined as $$100(\Delta p - \Delta p')/\Delta p$$

where $\Delta p$ is the pressure drop for a given test length for oil-water flow with no additive and $\Delta p'$ is the pressure drop for oil-water flow with a friction-reducing additive; both pressure drops measured at the same total flow rate.

The pressure drop measured for oil-water flow with no additive was approximately equal to the pressure drop for water only flowing at a velocity equal to the mixture velocity of the two-phase flow (i.e., $\Delta p = 0.355$ p.s.i./ft.). Thus, for the flow conditions of this experiment, the friction reductions shown in Table 2 can be thought of as the percentage difference in pressure drop between oil-water flow with a friction-reducing additive and water flow at the same mixture velocity. For large diameter pipelines, or for lower mixture velocities, this will not apply.

TABLE 2.—FRICTION REDUCTION IN TWO-PHASE OIL-WATER FLOW

Mixture Velocity=9.6 ft./sec. in ½ inch pipe
Oil/water volume ratio=47/55

| Run No. | Polyox conc. in water phase (p.p.m.w.) | $\Delta p^I$ Pres. drop for oil and water with no additive (p.s.i./ft.) | $\Delta p^{II}$ Pres. drop for oil and water with Polyox (p.s.i./ft.) | Pres. drop for water alone at 9.6 ft./sec. (p.s.i./ft.) | Friction reduction in two-phase flow [1] (percent) |
|---|---|---|---|---|---|
| 1 | 500 | 0.34 | 0.194 | 0.355 | 43 |
| 2A | 500 | 0.34 | 0.20 | 0.355 | 41 |
| 2B | 500 | 9.34 | 0.194 | 0.355 | 43 |
| 3 | 1,000 | 0.34 | 0.197 | 0.355 | 42 |
| 4 | 1,000 | 0.34 | 0.194 | 0.355 | 43 |

[1] Percent friction reduction=$100(\Delta p^I \Delta - p^{II})/\Delta p^I$

The use of oil-water transport in long pipelines is becoming more and more important as the use of thermal recovery techniques produce oils of higher viscosity from production areas where lower viscosity oils were once produced. Oil-water transport becomes increasingly more economical than other pipeline transport methods as the viscosity of the oil to be pumped becomes higher. Thus, the present invention could have widespread use in the pipeline transport of viscous oils.

In addition to applying the process of this invention to long distance pipelining of crude oil, the crude oil-water solutions of the present invention can be used in well fracturing processes. The oil and water solution containing the water-soluble polymer, e.g., a "Polyox" resin can be pumped down oil wells cocurrently at very high velocities in well fracturing operations. The present invention can be used to reduce pressure drop between the wellhead and the reservoir, and hence allow higher fracturing pressures to be attained in the reservoir.

The water-soluble polymers can be used in the two-phase flow where one phase contains a solid propping material. Crude oil with propping agents can be transported in water solutions containing the water-soluble polymers in well fracturing at lower pumping power requirements.

Also, the process of this invention can be used in transporting through pipelines solid materials and these materials can be incorporated in the oil phase. Thus, solids in slurry form can be transported through pipelines by the process of this invention.

While the present invention has been described as being applied to the transportation of viscous crude oil, it is realized that the method has other applications, such as for aiding the pumping in chemical plants of heavy fluids which are not soluble in or affected by water.

The foregoing description of the invention is merely intended to be explanatory thereof. Various changes in the details of the described method may be made, within the scope of the appended claims, without departing from the spirit of the invention.

I claim as my invention:

1. A method of transporting viscous petroleum oil through a pipeline comprising injecting into the pipeline a mixture of viscous petroleum oil having a viscosity of at least 3000 cs. at 60° F. and from about 10% to 53% by volume of a water solution containing from about 10 to about 1000 parts per million of a water-soluble alkylene oxide polymer having a molecular weight of at least one million, flowing the mixture under turbulent conditions, maintaining the water as the continuous phase of the mixture and in direct contact with the interior wall of the pipeline and pumping under reduced frictional conditions said mixture through the pipeline to a terminal station.

2. The method of transporting crude oil through a pipeline in accordance with claim 1 wherein the polymer in the water phase is a water-soluble polyethylene oxide having a molecular weight of about 3 to about 8 million.

3. A method of transporting viscous crude oil in the viscosity range of from about 3000 to about 50,000 cs.

at 60° F. through a pipeline comprising injecting into the pipeline a mixture of the viscous crude oil and from about 10 to about 53% by volume water solution containing 10 to 1000 parts per million of a water-soluble polymer of ethylene oxide having a molecular weight above one million, flowing the mixture under turbulent conditions, maintaining the water phase of the mixture as the continuous phase and in direct contact with the interior wall of the pipeline and pumping under reduced frictional conditions said mixture through the pipeline to a terminal station.

References Cited

UNITED STATES PATENTS

| | | | |
|---|---|---|---|
| 2,742,426 | 4/1956 | Brainerd | 166—42.1 X |
| 2,935,129 | 5/1960 | Allen et al. | 166—42.1 |
| 2,981,683 | 4/1961 | Simpson et al. | 252—8.3 |
| 3,006,354 | 10/1961 | Sommer et al. | 137—13 |
| 3,102,548 | 9/1963 | Smith et al. | 137—13 |
| 3,254,719 | 6/1966 | Root | 166—42.1 |
| 3,378,074 | 4/1968 | Kiel | 166—42.1 |
| 3,425,429 | 2/1969 | Kane | 137—13 |
| 3,434,485 | 3/1969 | Lummus | 137—13 |

FOREIGN PATENTS 625,980 8/1961 Canada.

STEPHEN J. NOVOSAD, Primary Examiner

I. A. CALVERT, Assistant Examiner

U.S. Cl. X.R.

166—308